US012603371B1

(12) United States Patent
Zhang et al.

(10) Patent No.: US 12,603,371 B1
(45) Date of Patent: Apr. 14, 2026

(54) PACK-LEVEL AND SPACE-LEVEL LIQUID NITROGEN FIRE SUPPRESSION LINKAGE SYSTEM AND METHOD FOR ENERGY STORAGE POWER STATION

(71) Applicants:Shenzhen Research Institute of China University of Mining and Technology, Shenzhen (CN); Fanshi High End Equipment Manufacturing Jiangsu Co., Ltd., Xuzhou (CN)

(72) Inventors: Guowei Zhang, Shenzhen (CN); Gangqiang Zhao, Xuzhou (CN); Xiangfei Liu, Shenzhen (CN); Ziming Zhao, Shenzhen (CN); Tiezhu Zhao, Xuzhou (CN); Zhiwei Zhang, Shenzhen (CN); Yu Wang, Shenzhen (CN)

(73) Assignees: Shenzhen Research Institute of China Unlversity of Mining and Technology, Guangdong (CN); Fanshi High End Equipment Manufacturing Jiangsu Co., Ltd., Jiangsu (CN)

( * ) Notice: Subject to any disclaimer, the term of this patent is extended or adjusted under 35 U.S.C. 154(b) by 0 days.

(21) Appl. No.: 19/313,110

(22) Filed: Aug. 28, 2025

(30) Foreign Application Priority Data

Oct. 15, 2024 (CN) .......................... 202411437849.5

(51) Int. Cl.
| | |
|---|---|
| *H01M 50/24* | (2021.01) |
| *A62C 3/16* | (2006.01) |
| *A62C 35/13* | (2006.01) |
| *H01M 10/48* | (2006.01) |
| *H01M 50/251* | (2021.01) |
| *H01M 50/673* | (2021.01) |

(52) U.S. Cl.
CPC ............... *H01M 50/24* (2021.01); *A62C 3/16* (2013.01); *A62C 35/13* (2013.01); *H01M 10/482* (2013.01); *H01M 10/486* (2013.01); *H01M 10/488* (2013.01); *H01M 50/251* (2021.01); *H01M 50/673* (2021.01); *H01M 2220/10* (2013.01)

(58) Field of Classification Search
CPC .. H01M 50/24; H01M 50/673; H01M 50/251; H01M 10/482; H01M 10/486; H01M 10/488; H01M 2220/10; A62C 3/16; A62C 35/13
USPC ......................................... 169/60, 70, 16, 46
See application file for complete search history.

(56) References Cited

U.S. PATENT DOCUMENTS

| | | | | |
|---|---|---|---|---|
| 2023/0155218 A1* | 5/2023 | Wickersham | ....... | H01M 50/143 169/54 |
| 2023/0277883 A1* | 9/2023 | Spencer | ............. | A62C 99/0018 169/62 |

* cited by examiner

*Primary Examiner* — Christopher S Kim
(74) *Attorney, Agent, or Firm* — Reising Ethington P.C.

(57) ABSTRACT

Provided are a pack-level and space-level liquid nitrogen fire suppression linkage system and method for an energy storage power station. The system includes an energy storage cabin. Inside the energy storage cabin, energy storage rooms in which battery clusters are stored are independent fire protection subareas. A fan, a plurality of combined detectors, and a control valve are provided in each fire protection subarea, and an audible and visual alarm, a fire alarm bell, and an emergency start-stop switch are provided on an outer wall of each fire protection subarea. Two circular holes are formed on an upper side of a panel of a pack of each battery cluster, with one circular hole for mounting a fire detector and the other circular hole for laying a pack-level liquid nitrogen fire suppression branch pipe.

4 Claims, 3 Drawing Sheets

PACK-LEVEL AND SPACE-LEVEL LIQUID NITROGEN FIRE SUPPRESSION LINKAGE SYSTEM AND METHOD FOR ENERGY STORAGE POWER STATION

CROSS REFERENCE TO RELATED APPLICATION

This patent application claims the benefit and priority of Chinese Patent Application No. 202411437849.5, filed with the China National Intellectual Property Administration on Oct. 15, 2024, the disclosure of which is incorporated by reference herein in its entirety as part of the present application.

TECHNICAL FIELD

The present disclosure belongs to the technical field of fire suppression for energy storage power stations, and particularly relates to a pack-level and space-level liquid nitrogen fire suppression linkage system and method for a centralized energy storage power station.

BACKGROUND

Lithium batteries have become a primary solution in China's electrochemical energy storage sector due to their advantages such as high energy density, high efficiency, and long service life. However, when subjected to external abuse conditions such as overheating, puncture, crush, overcharging, and overdischarging, lithium batteries can undergo thermal runaway, releasing a significant amount of heat and smoke, posing a high fire risk. This is particularly concerning in large-scale centralized energy storage power stations, where the high density of lithium batteries and highly concentrated energy make thermal runaway highly likely to trigger large-scale chain reactions, including fires or even explosions. Therefore, effective fire suppression technologies and methods are crucial to ensuring the safe operation of electrochemical energy storage power stations.

Currently, gaseous extinguishing agents such as perfluorohexanone and heptafluoropropane, as well as water-based extinguishing agents represented by fine water mist, are commonly used in lithium-ion battery energy storage power stations. However, their fire suppression effectiveness is limited, and none can meet the fire suppression requirements such as rapidly extinguishing open flames, providing sustained cooling, or suppressing explosions. Moreover, they fail to completely halt internal chemical reactions within the batteries, thereby being unable to effectively curb the progression and impact of battery fires.

SUMMARY

To address the aforementioned technical limitations, an objective of the present disclosure is to provide a pack-level and space-level liquid nitrogen fire suppression linkage system and method for a centralized energy storage power station so as to enhance the fire suppression efficiency while ensuring reliability and cost-effectiveness.

In order to solve the above technical problems, the present disclosure adopts the following technical solutions.

A pack-level and space-level liquid nitrogen fire suppression linkage system for an energy storage power station includes an energy storage cabin, where inside the energy storage cabin, energy storage rooms in which battery clusters are stored are independent fire protection subareas; a fan, a plurality of combined detectors, and a control valve are provided in each fire protection subarea, and an audible and visual alarm, a fire alarm bell, and an emergency start-stop switch are provided on an outer wall of each fire protection subarea;

two circular holes are formed on an upper side of a panel of a pack of each battery cluster, with one circular hole for mounting a fire detector and the other circular hole for laying a pack-level liquid nitrogen fire suppression branch pipe; an automatic quick opening valve is provided at a middle part of the pack-level liquid nitrogen fire suppression branch pipe, and a fire extinguishing nozzle is provided at a tail end of the pack-level liquid nitrogen fire suppression branch pipe;

a fire suppression cylinder room is provided on each of two sides within the energy storage cabin, and a liquid nitrogen explosion and fire suppression device is provided in the fire suppression cylinder room; a high-pressure nitrogen cylinder is provided on one side and a liquid nitrogen tank is provided on another side within the liquid nitrogen explosion and fire suppression device; a gas inlet, a liquid outlet, and a liquid replenishing port are provided at a top of the liquid nitrogen tank; a gas outlet pipe is connected to a top of the high-pressure nitrogen cylinder, and one end of the gas outlet pipe is connected to a pressure relief valve; one end of the pressure relief valve is connected to a solenoid valve, and one end of the solenoid valve is connected to the gas inlet at the top of the liquid nitrogen tank; the liquid outlet at the top of the liquid nitrogen tank is connected to a liquid nitrogen fire suppression main pipe of a corresponding fire protection subarea; the liquid nitrogen fire suppression main pipe comes out of a top of the liquid nitrogen explosion and fire suppression device and has one end connected to a solenoid valve, and one end of the solenoid valve is connected to a diversion valve; one end of the diversion valve is connected to a space-level liquid nitrogen fire suppression pipe and the other end of the diversion valve is connected to a pack-level liquid nitrogen fire suppression main pipe, and a plurality of fire extinguishing nozzles are provided on the space-level liquid nitrogen fire suppression pipe;

the space-level liquid nitrogen fire suppression pipes and the pack-level liquid nitrogen fire suppression main pipes of the fire protection subareas are connected with solenoid valves being provided at connections;

the detectors and the liquid nitrogen explosion and fire suppression devices are connected to a fire alarm host; and the detectors have a graded warning mechanism.

According to the above technical solution, a fire suppression method using the pack-level and space-level liquid nitrogen fire suppression linkage system for an energy storage power station described above includes the following steps:

step 1, carrying out space-level or pack-level fire suppression and protection according to warning signals from detections within a lithium battery energy storage power station;

step 2, triggering a control unit, and activating the audible and visual alarms, the fans, or the liquid nitrogen explosion and fire suppression devices by the fire alarm host, where the liquid nitrogen explosion and fire suppression devices are also manually controllable by the emergency start-stop switches;

step 3, performing linked control on the solenoid valve and the diversion valve on the liquid nitrogen fire suppression main pipe and the automatic quick opening valve on the pack-level liquid nitrogen fire suppression branch pipe within the corresponding fire protection subarea to deliver liquid nitrogen to a corresponding space-level fire suppression pipe or pack-level fire suppression pipe;

step 4, turning on the fire extinguishing nozzles to spray liquid nitrogen for extinguishing fire; and step 5, when the liquid nitrogen explosion and fire suppression device in the corresponding fire protection subarea undergoes a pressure drop or fails, initiating linked activation of the other liquid nitrogen explosion and fire suppression device and opening a solenoid valve at a connection of the corresponding space-level fire suppression pipe or pack-level fire suppression pipe for continuing to spray liquid nitrogen for fire suppression.

Further, a space-level fire suppression logic in step 1 is as follows:

(1) when a control host detects a first-level warning signal from a detector, namely an abnormal battery temperature or generation of part of combustible gas, the control host initiates linked activation of an audible and visual alarm and an exhaust fan in a fire protection subarea and outputs an alarm signal to an external system, and the pack-level and space-level liquid nitrogen fire suppression linkage system is in a warning state;

(2) when the control host detects a second-level warning signal, the control host is in a delayed activation state; after a delay time expires, linked activation of the audible and visual alarm is initiated, the exhaust fan is turned off, and a subarea solenoid valve and a liquid nitrogen explosion and fire suppression device A corresponding to an energy storage room are activated for space fire suppression, where the delay time is set by a controller; and (3) when the control host detects that one detector is in a third-level alarm state and that at least two detectors are in a first-level or above alarm state, the pack-level and space-level liquid nitrogen fire suppression linkage system determines that a battery catches fire, and the control host then initiates linked activation of the audible and visual alarm, turns off the exhaust fan, and activates the solenoid valve and the liquid nitrogen explosion and fire suppression device A corresponding to the energy storage room; meanwhile, a liquid nitrogen explosion and fire suppression device B on the other side is switched to a ready working state, and when a liquid nitrogen pressure in the liquid nitrogen explosion and fire suppression device A drops to a certain value, the control host initiates linked activation of the solenoid valve and the liquid nitrogen explosion and fire suppression device B on the other side of the energy storage room to continue spraying liquid nitrogen for protecting the energy storage room.

Further, a pack-level fire suppression logic in step 1 is as follows:

(1) when a pack-level detector is in a first-level warning state, the control host initiates linked activation of an audible and visual alarm system and the exhaust fan, while activating no liquid nitrogen explosion and fire suppression device for fire suppression;

(2) when the pack-level detector is in a second-level warning state, the control host initiates linked activation of the audible and visual alarm system, turns off the exhaust fan, and activates the liquid nitrogen explosion and fire suppression device for pulsed spraying; and (3) when the pack-level detector is in a third-level warning state, the control host initiates linked activation of the audible and visual alarm system, turns off the exhaust fan, and activates the liquid nitrogen explosion and fire suppression device for continuous spraying.

The present disclosure has the following beneficial effects: the space-level and pacl-level liquid nitrogen fire suppression pipes in adjacent energy storage rooms or subareas are connected and controlled using the solenoid valves. Not only is the independence of the system in each subarea guaranteed, but also the safety redundancy of alternate linkage of used and standby liquid nitrogen explosion and fire suppression devices is realized, thereby improving the reliability of the liquid nitrogen explosion and fire suppression devices. With space-level and pack-level graded warning response mechanisms and fire suppression strategies, space-level liquid nitrogen explosion and fire suppression devices are used in sequence in combination with pack-level second-level warning pulsed liquid nitrogen spraying and third-level warning continuous liquid nitrogen spraying, thereby reducing false alarms and redundant responses and improving the resource utilization efficiency and the fire suppression efficacy. The fire suppression efficiency is enhanced while ensuring reliability and cost-effectiveness.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

LIST OF REFERENCE NUMERALS

1, energy storage cabin; 2, energy storage room; 3, fire suppression cylinder room; 4, liquid nitrogen explosion and fire suppression device; 5, high-pressure nitrogen cylinder; 6, liquid nitrogen tank; 7, gas inlet; 8, liquid outlet; 9, liquid replenishing port; 10, gas outlet pipe; 11, pressure relief valve; 12, solenoid valve; 13, liquid nitrogen fire suppression main pipe; 14, battery pack; 15, diversion valve; 16, space-level liquid nitrogen fire suppression pipe; 17, pack-level liquid nitrogen fire suppression main pipe; 18, fire extinguishing nozzle of space-level liquid nitrogen fire suppression pipe; 19, fire detector; 20, pack-level liquid nitrogen fire suppression branch pipe; 21, automatic quick opening valve; and 22, fire extinguishing nozzle of pack-level liquid nitrogen fire suppression branch pipe.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art on the basis of the embodiments of the present disclosure without creative efforts shall fall within the protection scope of the present disclosure.

Embodiment 1

Figure 1:
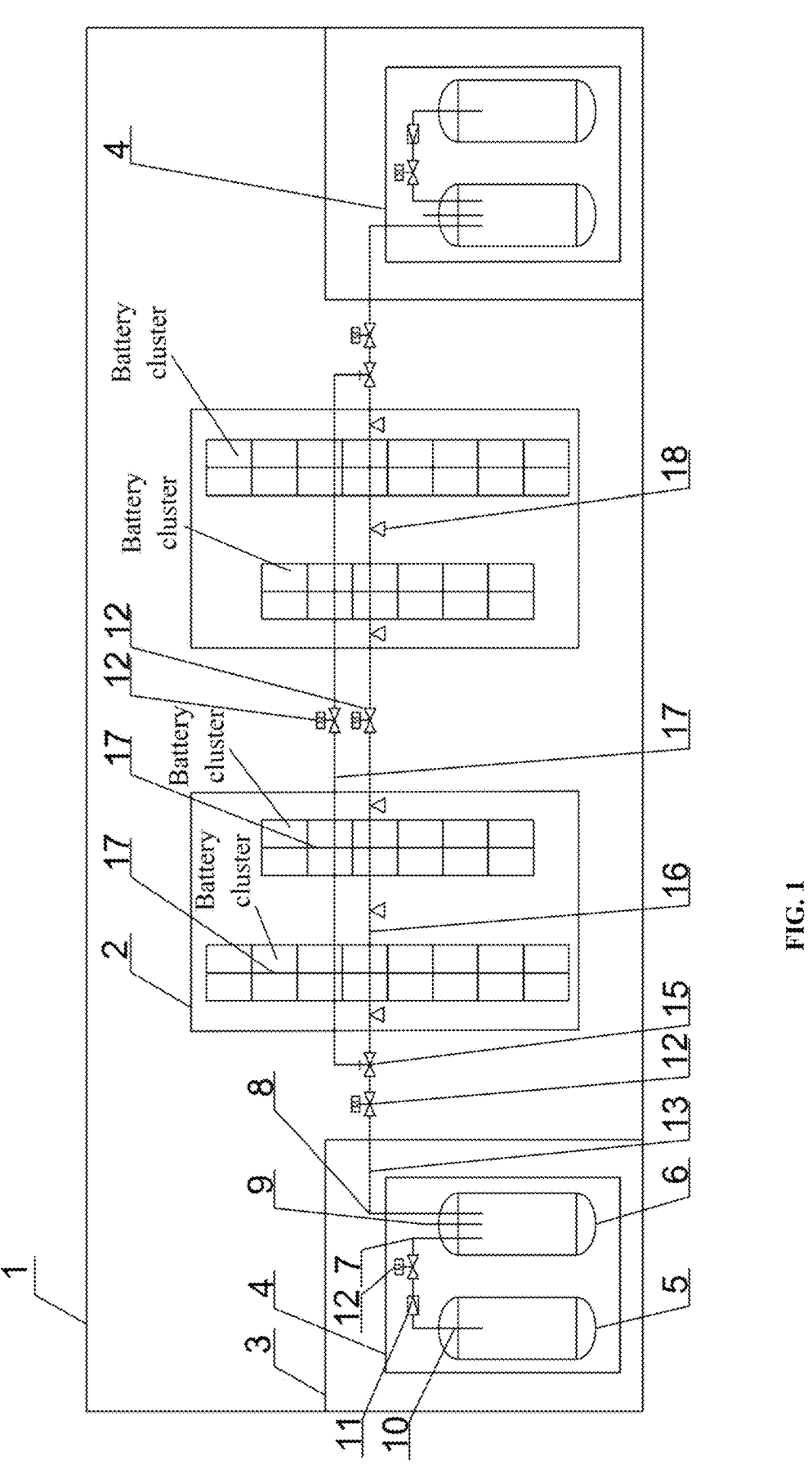
FIG. 1 is a structural schematic diagram of a pack-level and space-level liquid nitrogen fire suppression linkage system for an energy storage power station according to the present disclosure.
Figure 2:
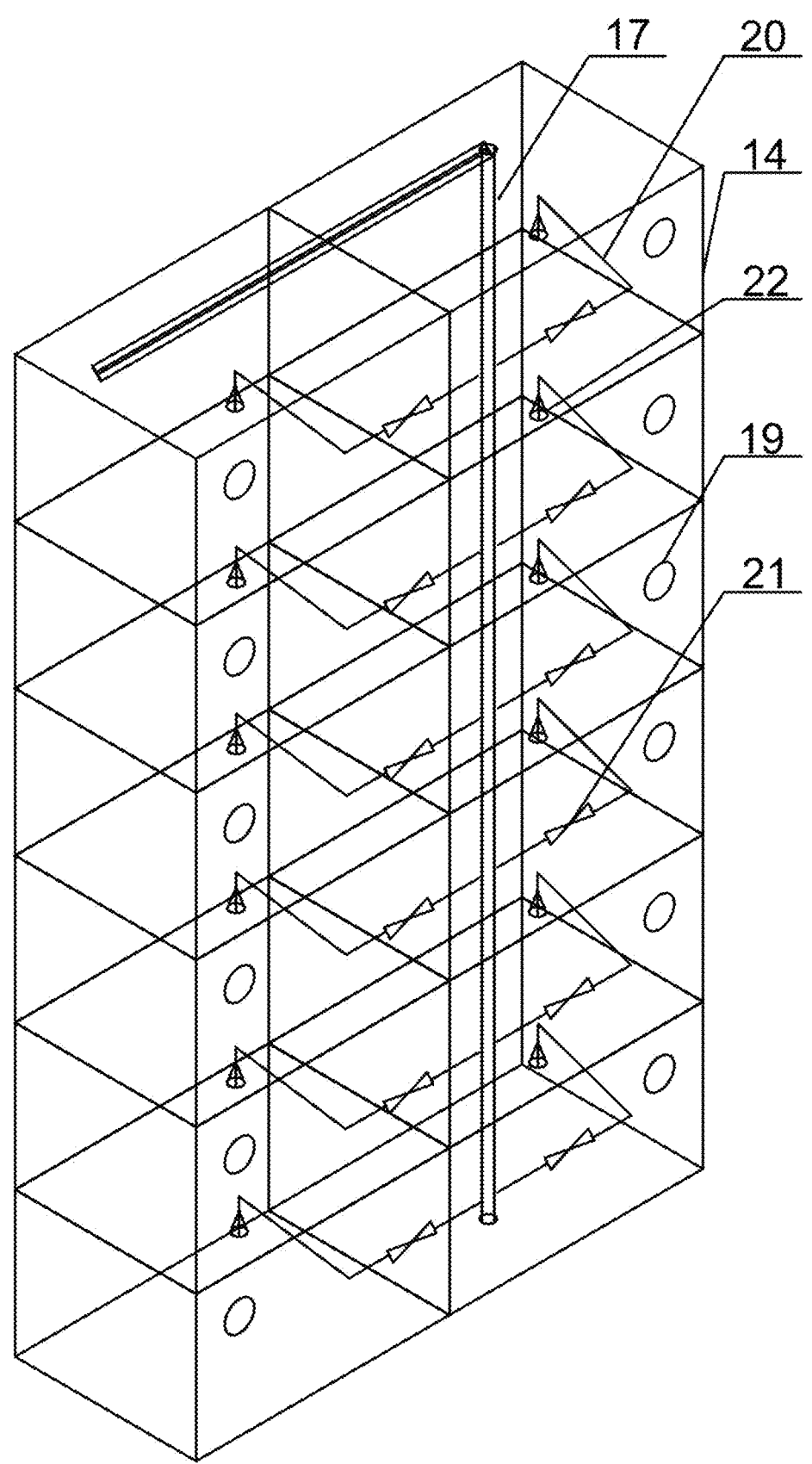
FIG. 2 is a structural schematic diagram of a liquid nitrogen fire suppression system for a single battery cluster in an energy storage cabin according to the present disclosure.

As shown in FIG. 1 and FIG. 2, the present disclosure provides a technical solution, namely a pack-level and space-level liquid nitrogen fire suppression linkage system for an energy storage power station, including an energy storage cabin 1.

Inside the energy storage cabin 1, energy storage rooms 2 in which battery clusters are stored are independent fire protection subareas. Two circular holes are formed on an upper side of a panel of a pack 14 of each battery cluster, with one circular hole for mounting a fire detector 19 and the other circular hole for laying a pack-level liquid nitrogen fire suppression branch pipe 20. An automatic quick opening valve 21 is provided at a middle part of the pack-level liquid nitrogen fire suppression branch pipe 20, and a fire extinguishing nozzle 22 is provided at a tail end of the pack-level liquid nitrogen fire suppression branch pipe 20.

A fire suppression cylinder room 3 is provided on each of two sides within the energy storage cabin 1, and a liquid nitrogen explosion and fire suppression device 4 is provided in the fire suppression cylinder room 3. A high-pressure nitrogen cylinder 5 is provided on one side and a liquid nitrogen tank 6 is provided on another side within the liquid nitrogen explosion and fire suppression device 4. A gas inlet 7, a liquid outlet 8, and a liquid replenishing port 9 are provided at a top of the liquid nitrogen tank 6. A gas outlet pipe 10 is connected to a top of the high-pressure nitrogen cylinder 5, and one end of the gas outlet pipe 10 is connected to a pressure relief valve 11. One end of the pressure relief valve 11 is connected to a solenoid valve 12, and one end of the solenoid valve 12 is connected to the gas inlet 7 at the top of the liquid nitrogen tank 6. The liquid nitrogen explosion and fire suppression device is driven by high-pressure nitrogen. The liquid outlet 8 at the top of the liquid nitrogen tank 6 is connected to a liquid nitrogen fire suppression main pipe 13 of a corresponding fire protection subarea. The liquid nitrogen fire suppression main pipe 13 comes out of a top of the liquid nitrogen explosion and fire suppression device 4 and has one end connected to a solenoid valve 12, and one end of the solenoid valve 12 is connected to a diversion valve 15 for controlling a flow direction of a fire suppression medium liquid nitrogen. One end of the diversion valve 15 is connected to a space-level liquid nitrogen fire suppression pipe 16 and the other end of the diversion valve is connected to a pack-level liquid nitrogen fire suppression main pipe 17, and a plurality of fire extinguishing nozzles 18 are provided on the space-level liquid nitrogen fire suppression pipe 16.

The space-level liquid nitrogen fire suppression pipes 16 and the pack-level liquid nitrogen fire suppression main pipes 17 of the fire protection subareas are connected with solenoid valves 12 being provided at connections. When one liquid nitrogen explosion and fire suppression device fails or undergoes a pressure drop, linked control may be performed on the other liquid nitrogen explosion and fire suppression device to guarantee the reliability of the liquid nitrogen explosion and fire suppression device and enhance the fire suppression efficacy.

Embodiment 2

Figure 3:
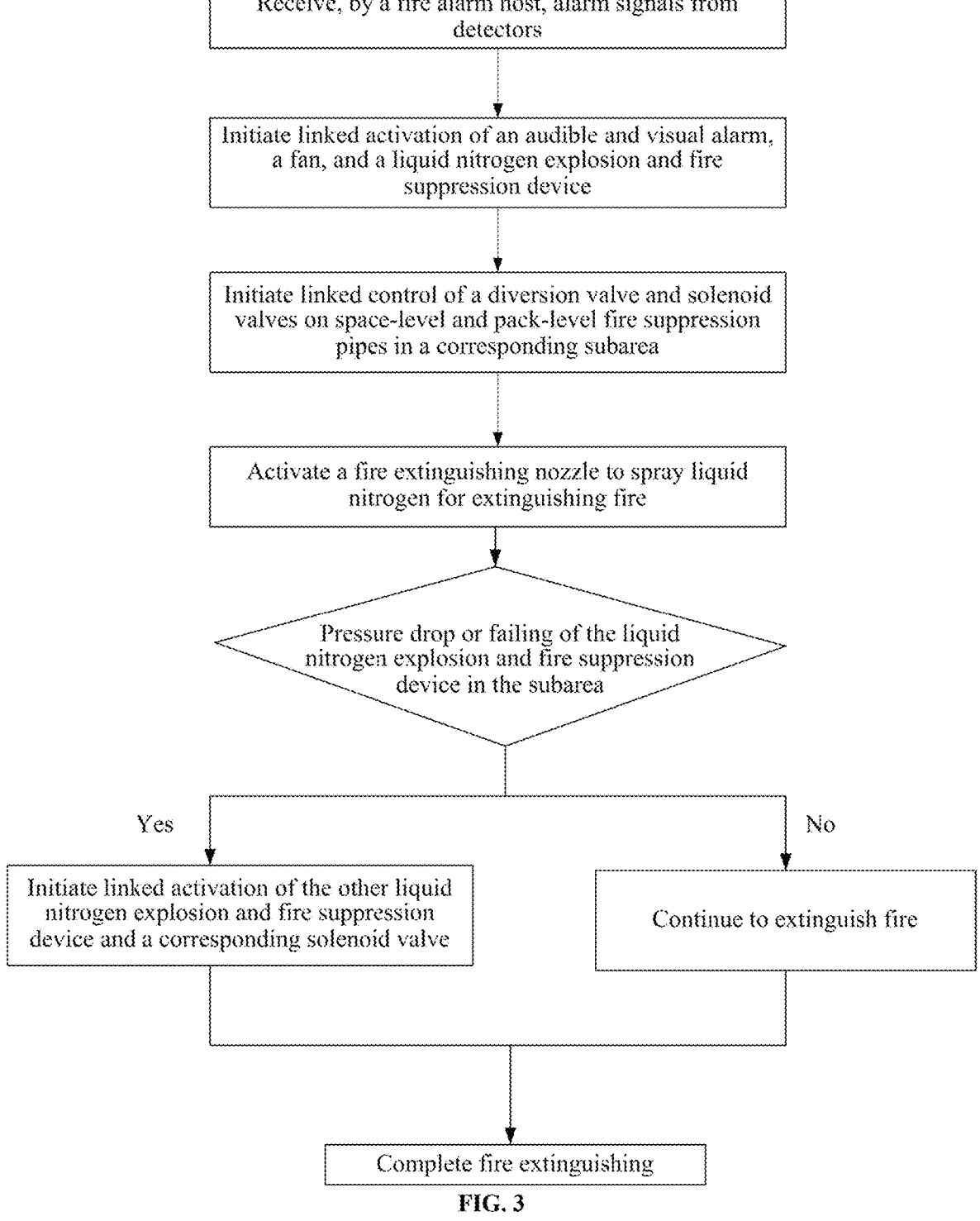
FIG. 3 is a flowchart of a fire suppression method according to the present disclosure.

As shown in FIG. 3, a fire suppression method using the pack-level and space-level liquid nitrogen fire suppression linkage method includes the following steps.

In step 1, a fire alarm host receives alarm signals from detectors.

In step 2, the fire alarm host initiates linked activation of an audible and visual alarm and a fan in a corresponding subarea according to an actual alarm signal. High-pressure nitrogen of a high-pressure nitrogen cylinder 5 enters a liquid nitrogen tank 6 via a gas inlet 7 through a pressure relief valve 11 and a solenoid valve 12. Driven by the high-pressure nitrogen, liquid nitrogen enters a fire suppression main pipe 13 via a liquid outlet 8.

In step 3, the fire suppression medium liquid nitrogen in the fire suppression main pipe 13 enters a space-level liquid nitrogen fire suppression pipe 16, a pack-level liquid nitrogen fire suppression main pipe 17, and a pack-level liquid nitrogen fire suppression branch pipe 20 in the corresponding subarea via a solenoid valve 14 and a diversion valve 15.

In step 4, a fire extinguishing nozzle 18 of the space-level fire suppression pipe or a fire extinguishing nozzle 22 of the pack-level liquid nitrogen fire suppression branch pipe 20 is activated to spray liquid nitrogen for extinguishing fire.

In step 5, when the liquid nitrogen explosion and fire suppression device 4 in the corresponding subarea undergoes a host pressure drop or fails, the fire alarm host initiates linked activation of the other liquid nitrogen explosion and fire suppression device 4. The liquid nitrogen in the liquid nitrogen explosion and fire suppression device 4 enters the space-level liquid nitrogen fire suppression pipe 16, the pack-level liquid nitrogen fire suppression main pipe 17, and the pack-level liquid nitrogen fire suppression branch pipe 20 of the corresponding room on fire via the solenoid valve 12 for continuous fire extinguishing until the fire has been extinguished.

A space-level fire suppression logic in step 1 is as follows:

(1) When a control host detects a first-level warning signal from a detector, namely an abnormal battery temperature or generation of part of combustible gas, the control host initiates linked activation of an audible and visual alarm and an exhaust fan in a fire protection subarea and outputs an alarm signal to an external system, and the pack-level and space-level liquid nitrogen fire suppression linkage system is in a warning state.

(2) When the control host detects a second-level warning signal, the control host is in a delayed activation state. After a delay time expires, linked activation of the audible and visual alarm is initiated, the exhaust fan is turned off, and a subarea solenoid valve and a liquid nitrogen explosion and fire suppression device A corresponding to an energy storage room are activated for space fire suppression. The delay time may be set by a controller.

(3) When the control host detects that one detector is in a third-level alarm state and that at least two detectors are in a first-level or above alarm state, the pack-level and space-level liquid nitrogen fire suppression linkage system determines that a battery catches fire. At this time, the control host then initiates linked activation of the audible and visual alarm, turns off the exhaust fan, and activates the solenoid valve and the liquid nitrogen explosion and fire suppression device A corresponding to the energy storage room. Meanwhile, a liquid nitrogen explosion and fire suppression device B on the other side is switched to a ready working state, and when a liquid nitrogen pressure in the liquid nitrogen explosion and fire suppression device A drops to a certain value, the control host initiates linked activation of the solenoid valve and the liquid nitrogen explosion and fire suppression device B on the other side of the energy storage room to continue spraying liquid nitrogen for protecting the energy storage room.

A pack-level fire suppression logic in step 1 is as follows:

(1) When a pack-level detector is in a first-level warning state, the control host initiates linked activation of an audible and visual alarm system and the exhaust fan. At this time, the control host activates no liquid nitrogen explosion and fire suppression device for fire suppression.

(2) When the pack-level detector is in a second-level warning state, the control host initiates linked activation of the audible and visual alarm system, turns off the exhaust fan, and activates the liquid nitrogen explosion and fire suppression device for pulsed spraying.

(3) When the pack-level detector is in a third-level warning state, the control host initiates linked activation of the audible and visual alarm system, turns off the exhaust fan, and activates the liquid nitrogen explosion and fire suppression device for continuous spraying.

Apparently, those skilled in the art can make various changes and modifications to the present disclosure without departing from the spirit and scope of the present disclosure. Thus, provided that these alterations and modifications of the present disclosure fall within the scope of the claims of the present disclosure and their equivalents, the present disclosure is also intended to include these alterations and modifications.

What is claimed is:

1. A pack-level and space-level liquid nitrogen fire suppression linkage system for an energy storage power station, comprising an energy storage cabin, wherein inside the energy storage cabin, energy storage rooms in which battery clusters are stored are provided, each energy storage room forms an independent fire protection subarea; a fan, a plurality of combined detectors, and a control valve are provided in each fire protection subarea, and an audible and visual alarm and an emergency start-stop switch are provided on an outside surface of each energy storage room;

two circular holes are formed on an upper side of a panel of each pack in each battery cluster, with one circular hole for mounting a fire detector and another circular hole for laying a pack-level liquid nitrogen fire suppression branch pipe; an automatic quick opening valve is provided at a middle part of each pack-level liquid nitrogen fire suppression branch pipe, and a fire extinguishing nozzle is provided at a tail end of each pack-level liquid nitrogen fire suppression branch pipe;

two fire suppression cylinder rooms are provided on two opposite sides within the energy storage cabin respectively, and a liquid nitrogen explosion and fire suppression device is provided in each fire suppression cylinder room; a nitrogen cylinder and a liquid nitrogen tank are provided in the liquid nitrogen explosion and fire suppression device; a gas inlet, a liquid outlet, and a liquid replenishing port are provided at a top of the liquid nitrogen tank; an end of a gas outlet pipe is connected to a top of the nitrogen cylinder, and another end of the gas outlet pipe is connected to an end of a pressure relief valve; another end of the pressure relief valve is connected to an end of a first solenoid valve, and another end of the first solenoid valve is connected to the gas inlet at the top of the liquid nitrogen tank; the liquid outlet at the top of the liquid nitrogen tank is connected to an end of a liquid nitrogen fire suppression main pipe of a corresponding fire protection subarea; the liquid nitrogen fire suppression main pipe comes out of a top of the liquid nitrogen explosion and fire suppression device and has another end connected to an end of a second solenoid valve, and another end of the second solenoid valve is connected to a first end of a diversion valve; a second end of the diversion valve is connected to a space-level liquid nitrogen fire suppression pipe and a third end of the diversion valve is connected to a pack-level liquid nitrogen fire suppression main pipe, and a plurality of fire extinguishing nozzles are provided on the space-level liquid nitrogen fire suppression pipe;

a space-level liquid nitrogen fire suppression pipe and a pack-level liquid nitrogen fire suppression main pipe of a fire protection subarea of the fire protection subareas are connected with a space-level liquid nitrogen fire suppression pipe and a pack-level liquid nitrogen fire suppression main pipe of an adjacent fire protection subarea of the fire protection subareas respectively, via respective third solenoid valves being provided at connections;

the combined detectors, fire detector, and liquid nitrogen explosion and fire suppression devices are connected to a fire alarm host; and the combined detectors and the fire detector have a graded warning mechanism.

2. A fire suppression method using the pack-level and space-level liquid nitrogen fire suppression linkage system for the energy storage power station according to claim 1, comprising following steps:

step 1, carrying out space-level or pack-level fire suppression and protection according to warning signals from detections within a lithium battery energy storage power station;

step 2, triggering a control unit, and activating audible and visual alarms, fans, or the liquid nitrogen explosion and fire suppression devices by the fire alarm host, wherein the liquid nitrogen explosion and fire suppression devices are also manually controllable by the emergency start-stop switches;

step 3, performing linked control on the second solenoid valve and the diversion valve on the liquid nitrogen fire suppression main pipe and the automatic quick opening valve on each pack-level liquid nitrogen fire suppression branch pipe within the corresponding fire protection subarea to deliver liquid nitrogen to a corresponding space-level fire suppression pipe or pack-level fire suppression pipe;

step 4, turning on the fire extinguishing nozzles to spray liquid nitrogen for extinguishing fire; and step 5, when the liquid nitrogen explosion and fire suppression device in the corresponding fire protection subarea undergoes a pressure drop or fails, initiating linked activation of the another liquid nitrogen explosion and fire suppression device and opening a third solenoid valve at a connection of a corresponding space-level fire suppression pipe or pack-level fire suppression pipe for continuing to spray liquid nitrogen for fire suppression.

3. The fire suppression method according to claim 2, wherein a space-level fire suppression logic in step 1 is as follows:

(1) when a control host detects a first-level warning signal from a detector, which indicates an abnormal battery temperature or generation of part of combustible gas, the control host initiates linked activation of an audible and visual alarm and a fan in a fire protection subarea and outputs an alarm signal to an external system, and the pack-level and space-level liquid nitrogen fire suppression linkage system is in a warning state;

(2) when the control host detects a second-level warning signal, the control host is in a delayed activation state; after a delay time expires, linked activation of the audible and visual alarm is initiated, the fan is turned off, and the second subarea solenoid valve and a first liquid nitrogen explosion and fire suppression device corresponding to an energy storage room are activated for space fire suppression, wherein the delay time is set by a controller; and (3) when the control host detects that one detector is in a third-level alarm state and that at least two detectors are in a first-level or above alarm state, the pack-level and space-level liquid nitrogen fire suppression linkage system determines that a battery catches fire, and the control host then initiates linked activation of the audible and visual alarm, turns off the fan, and activates the second solenoid valve and the first liquid nitrogen explosion and fire suppression device corresponding to the energy storage room; meanwhile, a second liquid nitrogen explosion and fire suppression device on another side is switched to a ready working state, and when a liquid nitrogen pressure in the first liquid nitrogen explosion and fire suppression device drops to a certain value, the control host initiates linked activation of the second solenoid valve and the second liquid nitrogen explosion and fire suppression device on the other side of the energy storage room to continue spraying liquid nitrogen for protecting the energy storage room.

4. The fire suppression method according to claim 2, wherein a pack-level fire suppression logic in step 1 is as follows:

(1) when a pack-level detector is in a first-level warning state, the control host initiates linked activation of an audible and visual alarm system and the fan, while activating no liquid nitrogen explosion and fire suppression device for fire suppression;

(2) when the pack-level detector is in a second-level warning state, the control host initiates linked activation of the audible and visual alarm system, turns off the fan, and activates the liquid nitrogen explosion and fire suppression device for pulsed spraying; and (3) when the pack-level detector is in a third-level warning state, the control host initiates linked activation of the audible and visual alarm system, turns off the fan, and activates the liquid nitrogen explosion and fire suppression device for continuous spraying.

* * * * *